(12) United States Patent
Kasai et al.

(10) Patent No.: US 10,471,906 B2
(45) Date of Patent: Nov. 12, 2019

(54) SENSOR BRACKET

(71) Applicant: HONDA MOTOR CO., LTD., Tokyo (JP)

(72) Inventors: Keita Kasai, Wako (JP); Mitsuru Tokiwa, Wako (JP); Tadahiro Matori, Wako (JP); Takahiro Ohmoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/468,691

(22) Filed: Mar. 24, 2017

(65) Prior Publication Data

US 2017/0274837 A1 Sep. 28, 2017

(30) Foreign Application Priority Data

Mar. 24, 2016 (JP) ................................. 2016-060378

(51) Int. Cl.
*H04N 5/225* (2006.01)
*B60R 11/04* (2006.01)
*B60R 11/00* (2006.01)

(52) U.S. Cl.
CPC ........... *B60R 11/04* (2013.01); *H04N 5/2252* (2013.01); *B60R 2011/0026* (2013.01); *B60R 2011/0084* (2013.01)

(58) Field of Classification Search
CPC ......... H04N 5/222; H04N 5/225; B60R 11/04
See application file for complete search history.

(56) References Cited

U.S. PATENT DOCUMENTS

| 2012/0207461 | A1* | 8/2012 | Okuda | .................... B60R 11/04 396/419 |
| 2014/0160284 | A1* | 6/2014 | Achenbach | .......... H04N 5/2251 348/143 |
| 2015/0015713 | A1* | 1/2015 | Wang | ....................... H04N 7/18 348/148 |
| 2016/0006911 | A1* | 1/2016 | Kimura | .............. H04N 13/0239 348/47 |
| 2016/0216595 | A1* | 7/2016 | Carlson | ................ G03B 17/561 |
| 2016/0318458 | A1* | 11/2016 | Wato | ....................... B60R 11/04 |

(Continued)

FOREIGN PATENT DOCUMENTS

JP 2006-313116 A 11/2006
JP 2010-29246 A 2/2010

(Continued)

OTHER PUBLICATIONS

Office Action dated Mar. 6, 2018, issued in counterpart Japanese Application No. 2016-060378, with English machine translation. (6 pages).

(Continued)

*Primary Examiner* — Anthony J Daniels
(74) *Attorney, Agent, or Firm* — Westerman, Hattori, Daniels & Adrian, LLP

(57) ABSTRACT

A sensor bracket includes a plate-shaped bracket, a front surface of which is attached to an inner surface of a windshield of a vehicle, the plate-shape bracket having a camera that detects a state around a vehicle mounted on a back surface, reference surfaces provided on a back surface of the plate-shaped bracket, the reference surfaces being parallel to each other.

1 Claim, 3 Drawing Sheets

(56) References Cited

U.S. PATENT DOCUMENTS

2017/0182955 A1* 6/2017 Takeda ................. B60R 11/04
2017/0217382 A1* 8/2017 Gunes ................... B60R 11/04
2017/0225629 A1* 8/2017 Salomonsson .......... B60R 11/04

FOREIGN PATENT DOCUMENTS

| JP | 2010-89745 A | 4/2010 |
| --- | --- | --- |
| JP | 2012-91597 A | 5/2012 |
| JP | 2013-203250 A | 10/2013 |
| JP | 2015-508728 A | 3/2015 |
| JP | 2015-93638 A | 5/2015 |
| JP | 2015-193366 A | 11/2015 |

OTHER PUBLICATIONS

Office Action dated Sep. 4, 2018, issued in counterpart Japanese Application No. 2016-060378, with English machine translation. (6 pages).

\* cited by examiner

SENSOR BRACKET

CROSS REFERENCES TO RELATED APPLICATIONS

The present application claims priority under 35 U.S.C. § 119 to Japanese Patent Application No. 2016-060378, filed Mar. 24, 2016, entitled "Sensor Bracket." The contents of this application are incorporated herein by reference in their entirety.

BACKGROUND

1. Field

The present disclosure relates to a sensor bracket used to attach an on-board camera or the like.

2. Description of the Related Art

Hitherto, a technique is known that accurately detects an obstacle and a pedestrian, a position of a traffic lane, whether a headlight of an oncoming vehicle is on, and the like by performing imaging of a portion in front of a vehicle with an on-board camera. In such a case, the on-board camera is mounted on a bracket that is adhered to a windshield.

For example, in Japanese Unexamined Patent Application Publication No. 2013-203250, while bosses of an on-board camera main body are hooked to hook-shaped portions, the on-board camera main body is slid from below towards an obliquely upward portion at the rear side and along a glass surface of the windshield to attach the bracket. When performing the above operation, first, the rear surface of the on-board camera main body comes into contact with a flat spring, and the flat spring is pushed and deformed by the on-board camera main body.

Furthermore, in a state in which the on-board camera main body is biased towards the front by the flat spring, an engagement protrusion of the on-board camera main body inserted into engagement holes of the bracket is abutted against the front side end portion such that an upper surface of the on-board camera main body is abutted against a back surface of an adhesion portion of the bracket (a surface that is on the side that opposes the on-board camera main body). With the above, the on-board camera main body is fixed while the front side thereof is biased against the bracket with the flat spring (Japanese Unexamined Patent Application Publication No. 2013-203250, paragraphs 0040 to 0043, FIGS. 1 and 5).

SUMMARY

Note that when a bracket is attached to a curved windshield, in view of the stability and for improving the appearance after being attached to the windshield, a curved bracket may be devised.

Although there is no description of the above in Japanese Unexamined Patent Application Publication No. 2013-203250, when attaching a curved bracket to a curved windshield, if the bracket becomes inclined, it is difficult to control the positioning between the on-board camera main body and the curved bracket and, disadvantageously, the obstacle and the like may not be accurately detected due to the axis deviation of the camera not being corrected.

The present disclosure has been made in view of the above situation and describes a sensor bracket that is capable of detecting an inclination of a sensor, such as an on-board camera that detects a state around the vehicle, with respect to a windshield.

A sensor bracket according to a first aspect of an exemplary embodiment includes a plate-shaped bracket body, a front surface of which is attached to an inner surface of a piece of glass (a glass shield) of the vehicle, the bracket body having a sensor, mounted on a back surface, that detects a state around a vehicle, and a plurality of planar portions that are provided on the back surface of the bracket body and that are parallel to each other.

In the sensor bracket of the present disclosure, by providing the plurality of planar portions on the back surface of the bracket body, the planar portions can be used as reference surfaces for detecting the inclination when the bracket body is attached to the glass. Furthermore, depending on the distance between the glass and the reference surfaces, the gap formed can be detected.

In the sensor bracket according to the first aspect of the embodiment, preferably, when the bracket body is attached to the glass, surfaces opposite the planar portions serve as attaching surfaces.

With such a configuration, the front surface of the bracket body becomes the contact surface between the bracket body and the glass, and the surface, serving as an attachment surface, that is opposite the planar portions is adhered to the glass with an adhesive or the like. In such a case, the distances between the attachment surface and the planar portions become smaller and the accuracy in detecting the inclination of the bracket body with respect to the glass can be improved.

According to a second aspect of the embodiment which is a method for calculating an inclination angle of a sensor bracket with respect to a piece of glass of a vehicle in a case in which a bracket body is attached to an inner surface of the piece of glass of the vehicle, the sensor bracket including the bracket body having a plate shape, a front surface of the bracket body being attached to the inner surface of the piece of glass of the vehicle, the bracket body having a sensor, mounted on a back surface, that detects a state around a vehicle, and a plurality of planar portions that are provided on the back surface of the bracket body and that are parallel to each other, the method including: distance measuring that measures distances between the plurality of planar portions and the glass; and inclination angle calculating that calculates the inclination angle of the sensor bracket with respect to the glass on a basis of the distances that have been measured in the distance measuring between each planar portion and the glass, and a distance between the planar portions.

According to the angle calculating method of the present embodiment, the positional relationship between the sensor and the bracket body is determined uniquely when the bracket body is mounted on the sensor. Accordingly, the angle in which the sensor is fitted to the glass can be calculated from the inclination angle of the bracket body with respect to the glass. Furthermore, by using the fitting angle, the accuracy in processing the detection information detected by the sensor can be improved.

DESCRIPTION OF THE PREFERRED EMBODIMENTS

Figure 1:
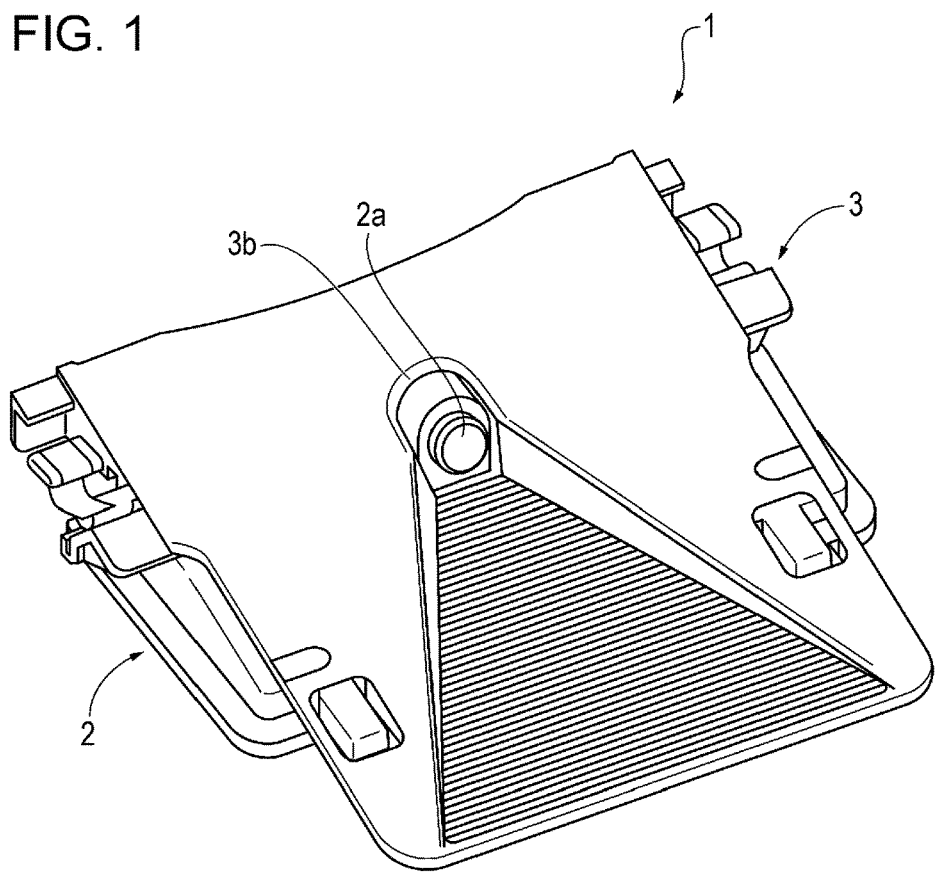
FIG. 1 is a diagram illustrating a configuration of a sensor bracket of the present disclosure on which a camera is mounted.

FIG. 1 illustrates a configuration in which a camera corresponding to a sensor of the present disclosure that detects the surroundings of a vehicle is mounted on a sensor bracket of the present disclosure. Hereinafter, the above configuration is referred to as a camera unit 1.

FIG. 1 is a perspective view of the camera unit 1 viewed obliquely from above. The camera unit 1 includes a camera 2 that is a sensor that performs imaging of an image in front of the vehicle, and a bracket 3 that is fixed to the windshield of the vehicle by being adhered thereon. Note that, hereinafter, description is given while the front of the vehicle is a front direction (a front side).

As illustrated in the drawings, the camera 2 is mounted on the bracket 3 from a lower side of the bracket 3 with an engaging mechanism described later. An opening 3b into which a lens 2a of the camera 2 is inserted is provided on an upper surface of the bracket 3. With the above, the camera 2 is capable of performing imaging of an image in front of the vehicle.

Figure 2:
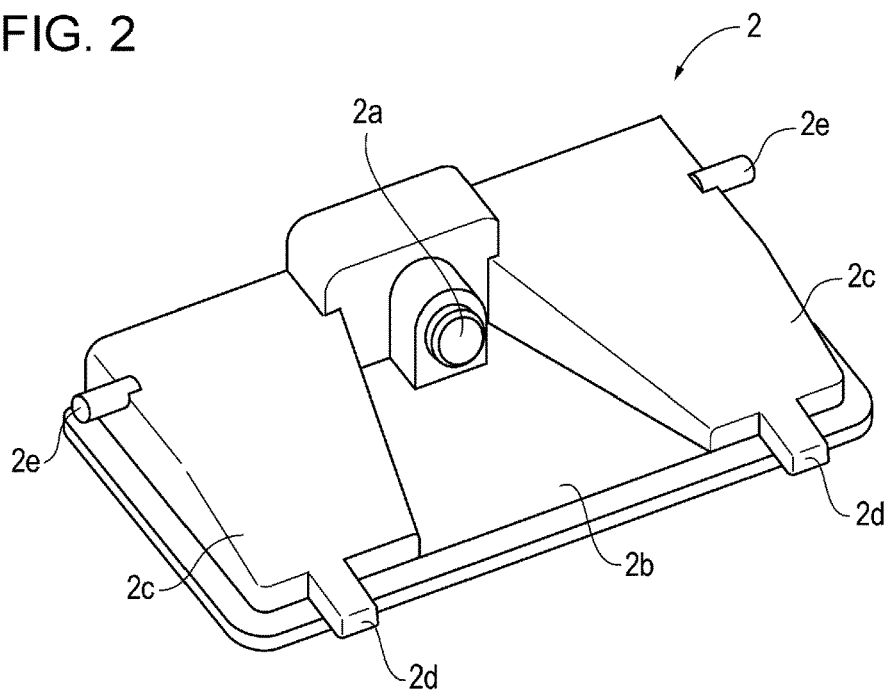
FIG. 2 is a perspective view of the whole camera.

FIG. 2 is a perspective view of the camera 2 viewed obliquely from above. The lens 2a is attached to an upper surface of the camera 2. Furthermore, a groove portion 2b that widens at an angle towards the front is formed on a front side of the lens 2a. While the details will be described later, a cavity 3a' that has a shape that is the same as that of the groove portion 2b is formed in the upper surface of the bracket 3 as well, so that the field of view of the lens 2a is not blocked.

Furthermore, both sides of the upper surface of the camera 2 are inclination portions 2c that incline downwards towards the front side. Since the front side of the bracket 3 is down when the bracket 3 is fixed to the windshield, by forming the inclination portions 2c on the upper surface of the camera 2, the entire upper surface of the camera 2 comes in contact with the bracket 3. Note that hook portions 2d are provided at the front end of the camera 2 and are engaged with hole portions 3c of the bracket 3 described later.

An engagement protrusion 2e is provided on a rear surface of the camera 2. The engagement protrusion 2e is a member for mounting the camera 2 on the bracket 3. While the details will be described later, in a state in which the camera 2 is mounted on the bracket 3, the engagement protrusion 2e presses flat springs 4 (spring members of the present disclosure) included in the bracket 3, and the lock portions 3g press, from below, the engagement protrusion 2e that has received biasing force and fixes the camera 2 to the bracket 3.

Figure 3:
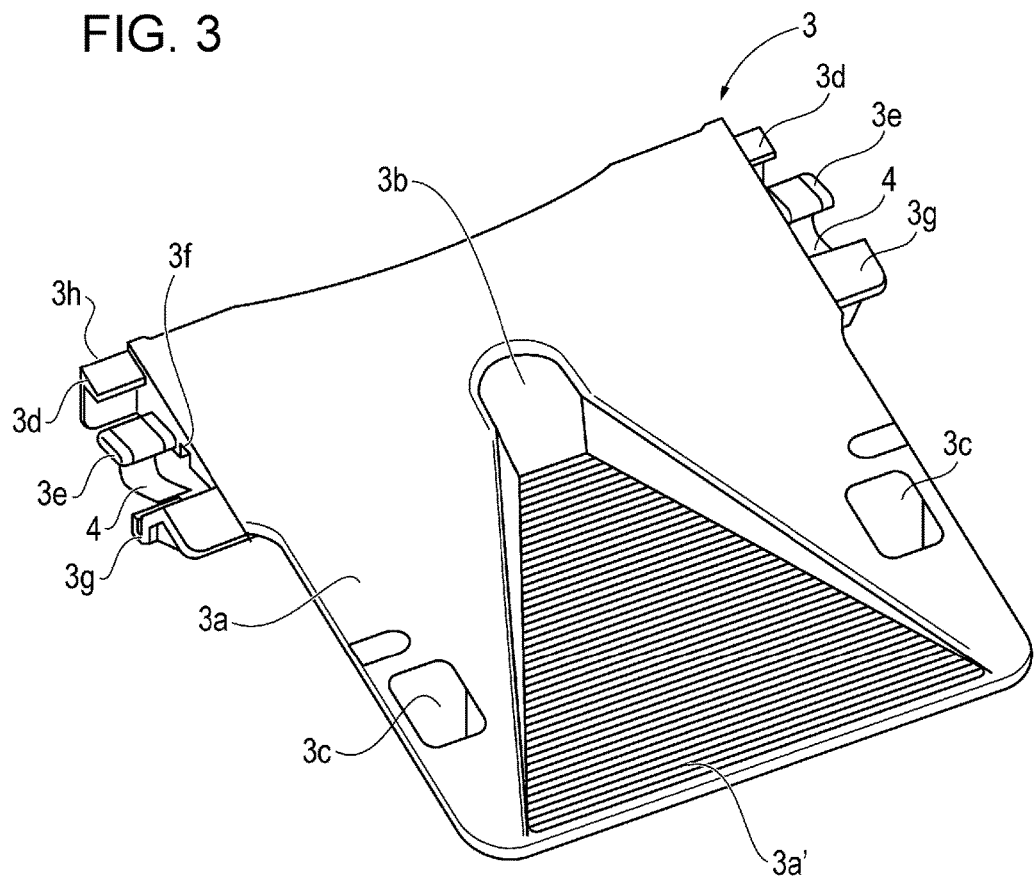
FIG. 3 is a perspective view of an upper surface side of the entire bracket.
Figure 4:
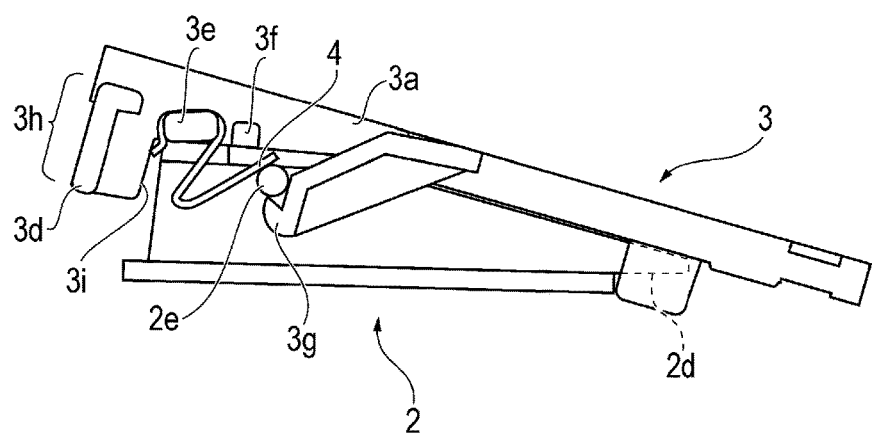
FIG. 4 is a side view of the bracket on which the camera has been mounted.
Figure 5:
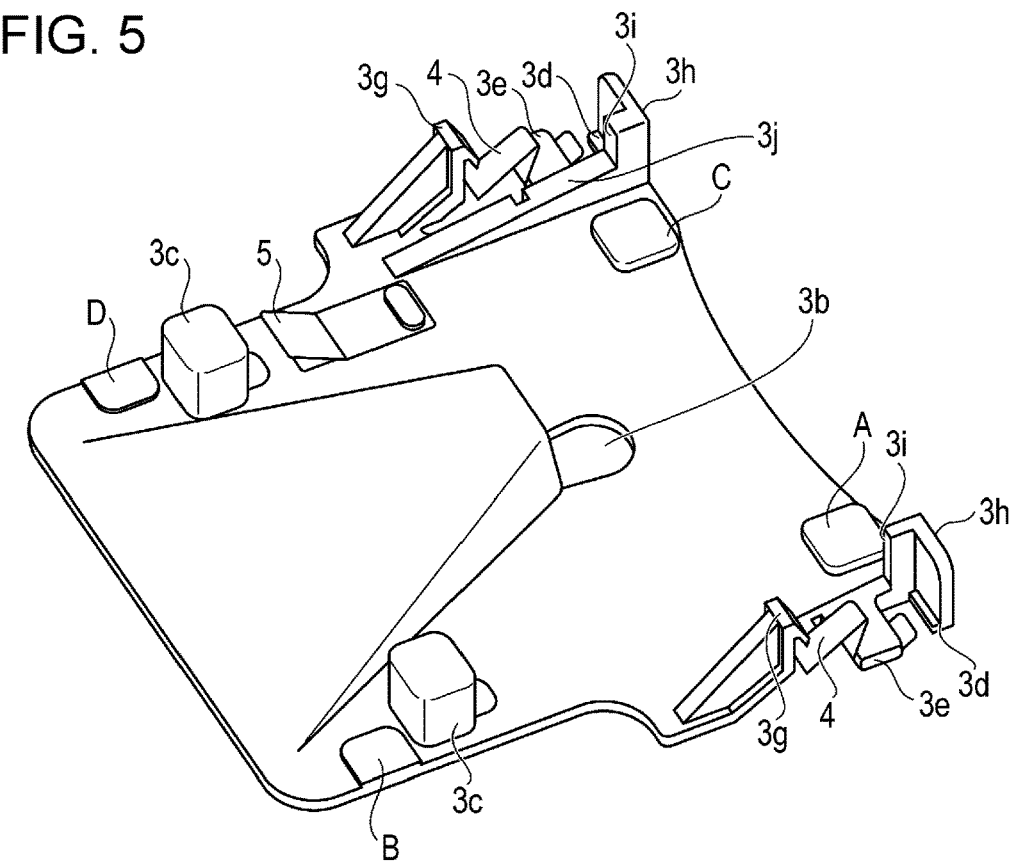
FIG. 5 is a perspective view of a lower surface side of the entire bracket.

Referring next to FIGS. 3 to 5, a structure of the bracket 3 will be described.

FIG. 3 is a perspective view of the upper surface side of the bracket 3 viewed obliquely from above. The opening 3b is provided at substantially the middle of a planar portion 3a of the upper surface of the bracket 3, and the cavity 3a' that widens at an angle towards the front is formed on the front side of the opening 3b.

The cavity 3a' has a stray light shielding structure (an antireflective shape) in which a number of grooves are formed so that the reflected light is not directly incident on the lens 2a. The cavity 3a' is slightly curved at the distal end side of the bracket 3 in a direction away from the windshield when the bracket 3 is attached to the windshield. With the above, only the bracket 3 can be seen from the black ceramic cutaway of the windshield; accordingly, the well-formed appearance can be maintained.

Furthermore, the hole portions 3c with which the hook portions 2d of the camera 2 are engaged are formed at both sides of the cavity 3a'. The hole portions 3c protrude towards the undersurface side of the bracket 3, and only the rear portions are open. Accordingly, when the camera 2 is mounted on the bracket 3, the hook portions 2d are accommodated in the recessed portions of the hole portions 3c (see FIG. 4).

An engaging mechanism to which the engagement protrusion 2e of the camera 2 is engaged is formed on the rear surface of the bracket 3. Specifically, as illustrated in FIG. 4 as well, the engaging mechanism includes, in the order from the rear end side of the bracket 3, stoppers 3d, projections 3e for the springs, and the lock portions 3g.

The stoppers 3d are restriction members that avoid a tool from hitting the windshield when the flat springs 4 attached to the projections 3e for the springs are dismounted. As illustrated in FIG. 4, the rear end portions of the flat springs 4 (made of aluminum, for example), which are attached to the projections 3e for the springs so as to be wound therearound, slightly project towards the stoppers 3d.

When dismounting the flat springs 4 from the projections 3e for the springs after the camera 2 has been separated from the bracket 3, the operator needs to press the rear end portions of the flat springs 4 from the lower side with a tool, such as a slotted screwdriver. In so doing, the L-shaped wall portions of the stoppers 3d function to restrict the displacement of the tool so that the tool having momentum does not damage the windshield by moving through to the windshield.

Recesses 3f are structures used when the operator attaches the flat springs 4 to the projections 3e for the springs, and are formed at positions adjacent to the projections 3e for the springs. The flat springs 4 can be fitted (temporarily fitted) into the projections 3e for the springs to a certain degree by pressing the flat springs 4 from the upper side of the projections 3e for the springs with the tool.

However, if the flat springs 4 are not completely fitted into the projections 3e for the springs, the flat springs 4 will come off when pressed by the engagement protrusion 2e of the camera 2. Accordingly, the operator completely fits each flat spring 4 to the corresponding projection 3e for the springs by pressing the flat spring by rotating the tool while the tip of the tool is abutted against the corresponding recess 3f. By receiving the tip of the tool in the recess 3f, the displacement of the tool is restricted and, accordingly, the windshield and the like are not damaged during the operation. In other words, formation of the stoppers 3d and the recesses 3f in the bracket 3 enables the operator to perform the operation at ease when, due to damage and plastic deformation, replacing the flat springs 4.

The lock portions 3g are members that fix the camera 2 in the up-down direction when the camera 2 is mounted on the bracket 3. The projections 3e for the springs are provided on the lateral side of the bracket 3 so as to project externally with respect to the stoppers 3d, and the flat springs 4 are attached to the projections. Furthermore, the lock portions 3g receive biasing force from the flat springs 4 through the engagement protrusion 2e of the camera 2.

When the camera 2 is mounted on the bracket 3, the operator slides the camera 2 so that the hook portions 2d of the camera 2 enter the hole portions 3c of the bracket 3 and, further, fixes the camera 2 such that the engagement protrusion 2e of the camera 2 presses the flat springs 4 upwards. In so doing, the engagement protrusion 2e moves while abutting against the undersides of the lock portions 3g and reaches a position where the engagement protrusion 2e presses the flat springs 4.

Furthermore, as illustrated in FIG. 4, the engagement protrusion 2e is pressed downwards with the biasing force of the flat springs 4 and the engagement protrusion 2e is caught by the distal end of the lock portions 3g. In other words, the lock portions 3g guide the engagement protrusion 2e to the engagement position. Since the flat springs 4 biases the engagement protrusion 2e downwards within the elastic deformation range, the camera 2 can be mounted on the bracket 3 in a stable manner.

On the other hand, when separating the camera 2 from the bracket 3, the operator abuts a finger against a rear outer wall 3h, which is behind the stopper 3d, corresponding to a finger contact portion of the present disclosure, and rearwardly pulls out the camera 2; accordingly, the flat springs 4 are pressed upwards and the engagement protrusion 2e is detached from the lock portions 3g. In other words, the camera 2 can be separated from the bracket 3 by sliding the camera 2 rearwardly in one direction.

Furthermore, immediately before the camera 2 is separated from the bracket 3, the rear end of the camera 2 abuts against vertical ribs 3i positioned between the stoppers 3d and the projections 3e for the springs. Since the vertical ribs 3i each corresponding to a wall surface of the present disclosure are positioned on the trajectory (extending in the sliding direction) of the dismounted camera 2, movement of the camera 2 is restricted such that when the camera 2 is separated from the bracket 3, the camera 2 is prevented from abruptly moving out. Furthermore, since the movement of the camera 2 is restricted by the vertical ribs 3i, unnecessary stress is not applied to the flat springs 4 any more when the camera 2 is separated from the bracket 3. Accordingly, plastic deformation of the flat springs 4 can be prevented from occurring.

FIG. 5 is a perspective view of the lower surface side of the bracket 3 viewed obliquely from above. The opening 3b is provided in substantially the middle of the lower surface of the bracket 3, and a projecting structure 3j is provided at a position lateral to the opening 3b. Since the shape of the lower surface of the bracket 3 is the same as the shape of the upper surface of the camera 2, the upper surface of the camera 2 abuts against the bracket 3 in a wide area when the camera 2 is mounted on the bracket 3. With the above, the pressure of the camera 2 during attachment does not concentrate on a specific position and the camera 2 and the bracket 3 can be prevented from becoming damaged.

A bottom-plate spring 5 that biases the camera 2 downwards (the upper direction in FIG. 5) is attached on the rear side (the upper side of the figure) of the hole portions 3c. Although the bracket 3 of the present exemplary embodiment only has a single bottom-plate spring 5, two bottom-plate springs 5 may be provided on the rear side of the two hole portions 3c.

Furthermore, the vertical ribs 3i are provided between the stoppers 3d and the projections 3e for the springs. Although narrow in width, the vertical ribs 3i include wall surfaces that are orthogonal to the sliding direction in which the camera 2 is separated.

Reference surfaces A to D each corresponding to a planar portion of the present disclosure that are cut in a planar manner and that are parallel to each other are provided in the four corners of the bracket 3 on the lower surface side.

Furthermore, when the bracket 3 is attached to a curved windshield, portions in the planar portion 3a that are opposite the reference surfaces A to D are, as adhesion surfaces, adhered to the windshield with double-sided tapes. In so doing, there are cases in which the bracket 3 is inclined slightly; however, by measuring the distances between the reference surfaces A to D and the windshield, the inclination of the bracket 3 with respect to the windshield can be measured.

Figure 6:
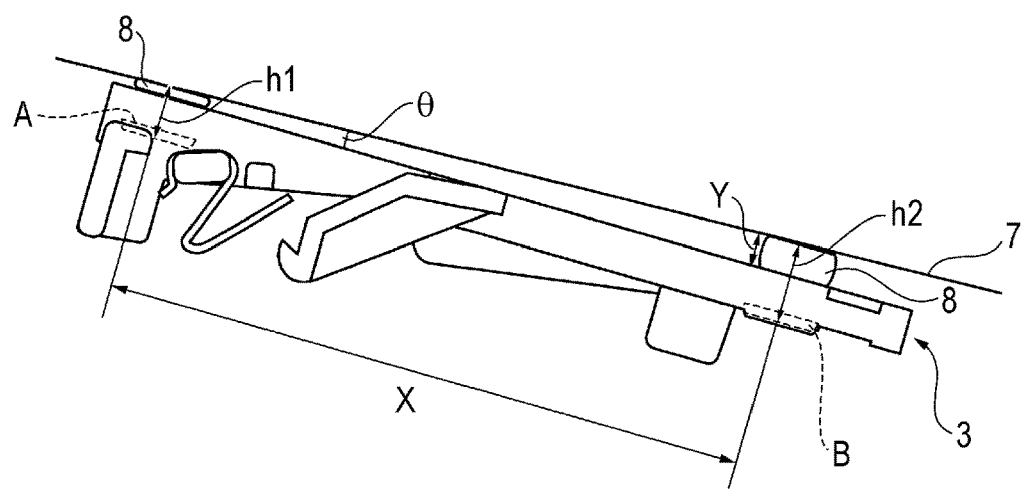
FIG. 6 is a diagram illustrating a state in which the bracket is attached to a windshield.

Hereinafter, a method for calculating the angle of the bracket 3 with respect to the windshield will be described. FIG. 6 illustrates a state in which the bracket 3 is adhered to a windshield 7 with a double-sided tape 8. In the above, X is the distance between the reference surface A and the reference surface B of the bracket 3. Furthermore, distances between each of the reference surfaces and the windshield, such as a distance h1 between the reference surface A and the windshield 7 and a distance h2 between the reference surface B and the windshield 7, are measured (corresponding to distance measuring of the present disclosure). Note that a distance Y of the gap on the upper side of the reference surface B in the drawing between the bracket 3 and the windshield 7 is the difference between the distance h2 and the distance h1, that is, |h2−h1|.

With the above, an inclination angle θ of the bracket 3 attached to the windshield 7 can be obtained (corresponding to inclination angle calculating) by $$\tan \theta = Y/X. \tag{1}$$

Since the camera 2 mounted on the bracket 3 has the same inclination angle θ, correction of the axis deviation can be made easily.

In actuality, although there are double-sided tapes 8 (with a thickness of about 0.8 mm) above the reference surfaces A and B, a slight inclination created by the thickness of the double-sided tapes 8 can be absorbed. As described above, when controlling the inclination of the bracket 3, the inclination angle θ can be calculated and correction thereof can be made if there are (at least three) flat surfaces such as the reference surfaces A to D.

As described above, the camera unit 1 of the exemplary embodiment includes the camera 2 that detects the state around the vehicle, and the bracket 3 attached to the inner surface of the windshield 7 of the vehicle, and the camera 2 is mounted on the bracket 3. The reference surfaces A to D provided on the surface of the bracket 3 on which the camera 2 is mounted serve as reference planes for detecting the inclination of the bracket 3 with respect to the windshield 7. Furthermore, the portions of the planar portion 3a opposite the reference surfaces A to D are used as adhesion surfaces adhered to the windshield 7.

The exemplary embodiment described above is an example of the present disclosure and various modifications can be made. In the exemplary embodiment described above, while the camera 2, which serves as a sensor of the present disclosure that detects the state around the vehicle, has been illustrated, the sensor may be other types of sensors such as a radar device.

Furthermore, while the bracket 3 is made of metal, not limiting the material to any material, the bracket 3 may be molded of plastic or the like. While the engaging mechanism of the bracket 3 is positioned on the rear side of the bracket 3, there is no restriction in the position and, for example, the spring members and the lock portions may be provided at areas that cannot be partially or totally seen from the outside.

What is claimed is:

1. A method for calculating an inclination angle of a sensor bracket with respect to a glass shield of a vehicle, the method comprising:
   providing a plate-shaped sensor bracket body having a front surface and an opposite, back surface, the front surface being attached to an inner surface of the glass shield of the vehicle, a sensor being mounted on the back surface of the sensor bracket body and configured to detect a state around the vehicle, the sensor bracket body having a plurality of planar portions that are provided on the back surface and that are parallel to one another;
   measuring distances between each of the plurality of planar portions and the glass shield; and
   calculating the inclination angle of the sensor bracket with respect to the inner surface of the glass shield on a basis of the distances measured between each planar portion and the glass shield, and predetermined distances between the plurality of planar portions.

* * * * *